United States Patent [19]

Matsuno et al.

[11] Patent Number: 4,736,726
[45] Date of Patent: Apr. 12, 1988

[54] METHOD AND SYSTEM FOR CONTROLLING FUEL IGNITION TIMING IN DIESEL ENGINE

[75] Inventors: Kiyotaka Matsuno; Fumiaki Kobayashi; Masaomi Nagase; Yoshiyasu Itou, all of Toyota; Keisuke Tsukamoto, Nagoya; Mikio Kizaki, Toyota, all of Japan

[73] Assignee: Toyota Jidosha Kabushiki Kaisha, Aichi, Japan

[21] Appl. No.: 885,090

[22] Filed: Jul. 14, 1986

[30] Foreign Application Priority Data

Jul. 18, 1985 [JP] Japan .................. 60-158630

[51] Int. Cl.$^4$ ............................................. F02M 59/00
[52] U.S. Cl. ...................... 123/501; 123/357
[58] Field of Search ............ 123/357, 501, 502

[56] References Cited

U.S. PATENT DOCUMENTS

| | | | |
|---|---|---|---|
| 3,731,664 | 5/1973 | Tsuzuki | 123/357 |
| 3,796,197 | 3/1974 | Locher | 123/501 |
| 3,815,564 | 6/1974 | Suda | 123/501 |
| 4,033,310 | 7/1977 | Nicolls | 123/501 |
| 4,368,705 | 1/1983 | Stevenson | 123/501 |
| 4,450,817 | 5/1984 | Ibuki | 123/501 |
| 4,463,729 | 8/1984 | Bullis et al. | 123/501 |

FOREIGN PATENT DOCUMENTS

| | | | |
|---|---|---|---|
| 56-146023 | 11/1981 | Japan | 123/501 |
| 58-25584 | 2/1983 | Japan | 123/501 |

Primary Examiner—Ronald B. Cox
Attorney, Agent, or Firm—Parkhurst & Oliff

[57] ABSTRACT

In determining an optimum target fuel ignition timing in accordance with the engine operating conditions, including at least an engine load and an engine speed, the target ignition timing is determined on the basis of a corrected engine load and a corrected engine speed. The corrected engine load and corrected engine speed are obtained by making corrections, according to the engine operating conditions, to a detected engine load and a detected engine speed, respectively. In this way, the optimum target fuel ignition timing according to the engine operating conditions can be obtained without directly detecting a fuel injection quantity.

8 Claims, 7 Drawing Sheets

METHOD AND SYSTEM FOR CONTROLLING FUEL IGNITION TIMING IN DIESEL ENGINE

BACKGROUND OF THE INVENTION

This invention relates to a method and a system for controlling fuel ignition timing in a diesel engine, and more particularly to an improved method and system for controlling fuel ignition timing in a diesel engine having an ignition timing sensor and suitable for use in an electronic control diesel engine for a motor vehicle, wherein the optimum target ignition timing is determined in accordance with the engine operating conditions including at least an engine load and an engine speed, to control the fuel ignition timing so that the optimum target ignition timing can be obtained.

In controlling the fuel injection timing to optimize the exhaust gas purifying performance and the like in a diesel engine, particularly a diesel engine for a motor vehicle, it is necessary to obtain the optimum target fuel ignition timing in accordance with the engine operating conditions including at least an engine load and an engine speed.

Japanese Patent Applications (Laid-Open) Nos. 146023/1981 and 25584/1983 disclose methods of directly determining the target fuel ignition timing from raw data of the engine load (fuel injection quantity) and the engine speed. Furthermore, U.S. Pat. No. 4,463,729 discloses a method of controlling fuel injection timing by use of an ignition timing sensor. However, the above references teach use of the actual engine speed. When the ignition timing control must be carried out at a position where the engine speed is apparently shifted by an idle rotation speed control or the like, such control as described above cannot be carried out. Furthermore, when the fuel injection quantity is used as the engine load, it is necessary to know the fuel injection quantity; if the fuel injection quantity is mechanically controlled and the fuel ignition timing is electronically controlled, there exists the disadvantage that the fuel injection quantity must be detected by some method.

SUMMARY OF THE INVENTION

The present invention has been developed to obviate the above-described disadvantages of the prior art and has as its object the provision of a method and a system for controlling fuel injection timing in a diesel engine wherein an optimum target fuel ignition timing can be precisely determined in accordance with the engine operating conditions without directly detecting the fuel injection quantity.

To achieve the above-described object, the present invention contemplates a method of controlling fuel ignition timing in a diesel engine wherein an optimum target fuel ignition timing is determined in accordance with the engine operating conditions including at least an engine load and an engine speed, to control the fuel ignition timing so that the target ignition timing can be obtained. The technical gist of the invention is shown in FIG. 1 and comprises the steps of:

detecting the engine load;

detecting the engine speed;

correcting the engine load value thus detected according to the engine operating conditions, to thereby determine a corrected engine load;

correcting the engine speed value thus detected according to the engine operating conditions, to thereby determine a corrected engine speed; and determining a target ignition timing on the basis of the corrected engine load and the corrected engine speed.

In one specific embodiment of the present invention, a corrected accelerator opening is used as the value of the corrected engine load.

In another specific embodiment of the present invention, a low temperature start correction value and a dashpot correction value are added to a detected accelerator opening value to determine the corrected accelerator opening.

In yet a further specific embodiment of the present invention, a correction value for controlling an idle speed is added to a detected engine speed to determine the corrected engine speed.

According to the present invention, in determining the optimum target fuel ignition timing in accordance with the engine operating conditions including at least an engine load and an engine speed, a target ignition timing is determined from the corrected engine load and the corrected engine speed which are determined by correcting, according to the engine operating conditions, the engine load and the engine speed detected, respectively. As a conseqence, the optimum target ignition timing can be precisely obtained without directly detecting a fuel injection quantity.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereafter be given of the embodiments of the electronic control diesel engine for a motor vehicle, to which is adapted the method of controlling the fuel ignition timing according to the present invention, with reference to the accompanying drawings.

Figure 1:
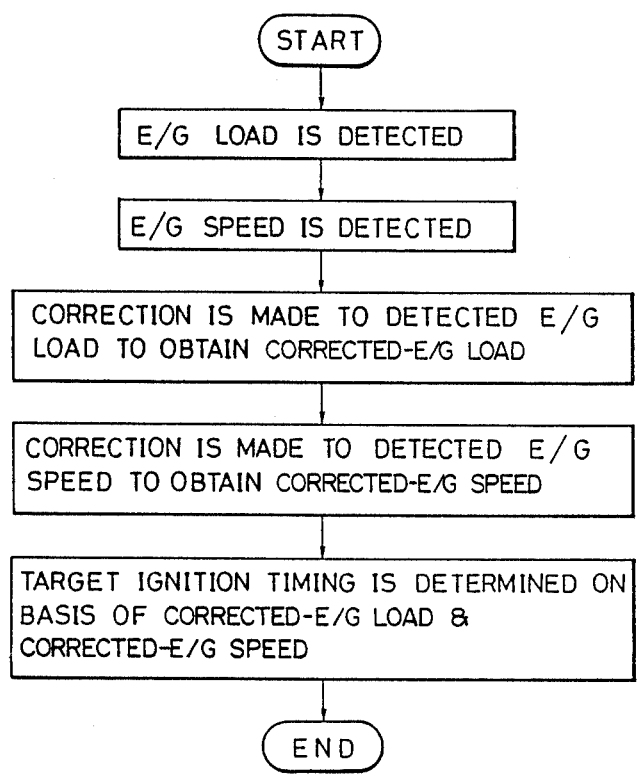
FIG. 1 is a flow chart showing the technical gist of the method of controlling the fuel ignition timing in a diesel engine according to the present invention.
Figure 2:
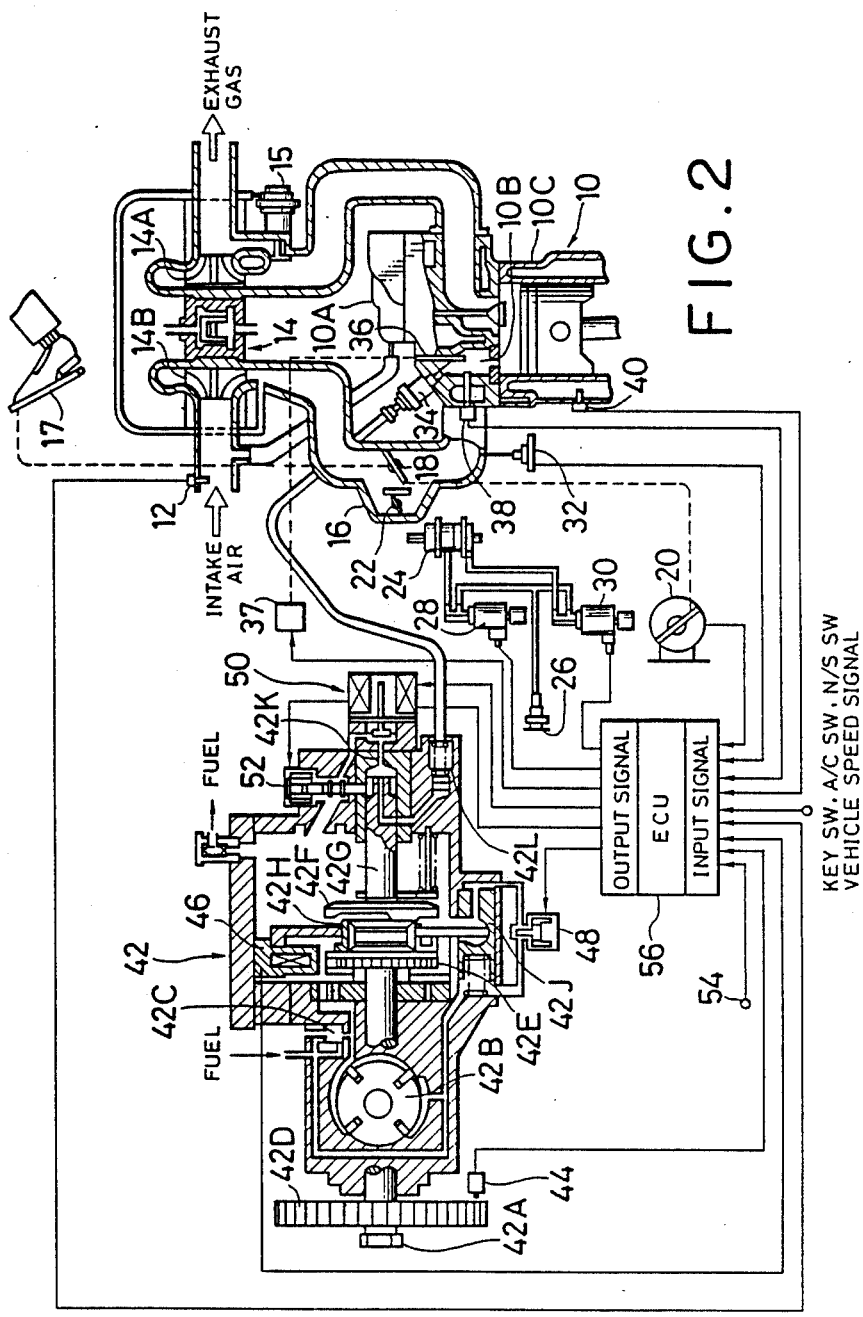
FIG. 2 is a sectional view, partially including a block diagram, showing the general arrrangement of a first embodiment of the electronic control diesel engine for motor vehicle, to which is applied the present invention.

As shown in FIG. 2, in the first embodiment of the present invention, an intake-air temperature sensor 12 for detecting the temperature of intake-air is provided at the downstream side of an air cleaner, not shown. Provided at the downstream side of the intake-air temperature sensor 12 is a turbocharger 14 including a turbine 14A rotatable by thermal energy of exhaust gas and a compressor 14B rotatable in association with the turbine 14A. The upstream side of the turbine 14A of the turbocharger 14 and the downstream side of compressor 14B communicate with each other through a waist gate valve 15 for preventing an excessive rise of the intake-air pressure.

Provided in a venturi 16 disposed at the downstream side of the compressor 14B is a main intake-air throttle valve 18 non-linearly rotatable in association with an accelerator pedal 17 provided at a driver's seat, for restricting an intake-air flow rate during idling and the like. An opening of the accelerator pedal 17 (hereinafter referred to as an "accelerator opening") Accp is detected by an accelerator position sensor 20.

An auxiliary intake-air throttle valve 22 is provided in parallel to the main intake-air throttle valve 18, and an opening of the auxiliary intake-air throttle valve 22 is controlled by a diaphragm device 24. Supplied to the diaphragm device 24 is negative pressure produced by a vacuum pump 26 through a vacuum switching valve (hereinafter referred to as a "VSV") 28 or 30.

An intake-air pressure sensor 32 for detecting intake-air pressure is provided at the downstream side of the intake-air throttle valves 18 and 22.

An injection nozzle 34, a glow plug 36 and an ignition timing sensor 38, the forward ends of which are located in an engine combustion chamber 10B, are provided on a cylinder head 10A of a diesel engine 10. Furthermore, a water temperature sensor 40 for detecting engine cooling water temperature is provided on a cylinder block 10C of the diesel engine 10.

A glow current is supplied to the glow plug 36 through a glow relay 37.

The fuel is delivered under pressure to the injection nozzle 34 from an injection pump 42. The injection pump 42 is provided thereon with: a pump driving shaft 42A rotatable in association with the rotation of a crankshaft of the diesel engine 10; a feed pump 42B (FIG. 2 shows a state where the feed pump 42B is developed through 90°) solidly secured to the pump driving shaft 42A, for applying pressure to the fuel; a fuel pressure regulator valve 42C for regulating fuel feeding pressure; a reference position sensor 44 formed of an electromagnetic pickup, for example, for detecting a reference position, e.g. a top dead center (TDC) from a rotational displacement of a pump driving pulley 42D solidly secured to the pump driving shaft 42A; an engine speed sensor 46 formed of an electromagnetic pickup, for example, for detecting an engine speed from a rotational displacement of a gear wheel 42E solidly secured to the pump driving shaft 42A; a roller ring 42H for reciprocating a face cam 42F and a plunger 42G, and changing the relative timing thereof; a timer piston 42J (FIG. 2 shows a state where the roller ring 42H is developed through 90°) for changing the rotational position of the roller ring 42H; a timing control valve (hereinafter referred to as a "TCV") 48 for controlling the position of the timer piston 42J to control an injection timing; an electromagnetic spill valve 50 for changing a timing of fuel escaping from the plunger 42G through a spill port 42K to control the fuel injection quantity per stroke; a fuel cut valve (hereinafter referred to as an "FCV") 52 for cutting the fuel; and a delivery valve 42L for preventing back flow and after-dripping.

Inputted to and processed in an electronic control unit (hereinafter referred to as an "ECU") 56 are outputs from the intake-air temperature sensor 12, the accelerator position sensor 20, the intake-air pressure sensor 32, the ignition timing sensor 38, the water temperature sensor 40, the reference position sensor 44, the engine speed sensor 46, a glow current sensor 54 for detecting the glow current passed through the glow plug 36, a key switch, an air conditioner switch, a neutral safety switch, a vehicle speed signal and the like. The VSV 28, 30, the glow relay 37, the TCV 48, the electromagnetic spill valve 50, the FCV 52 and the like are controlled in response to outputs from the ECU 56.

Figure 3:
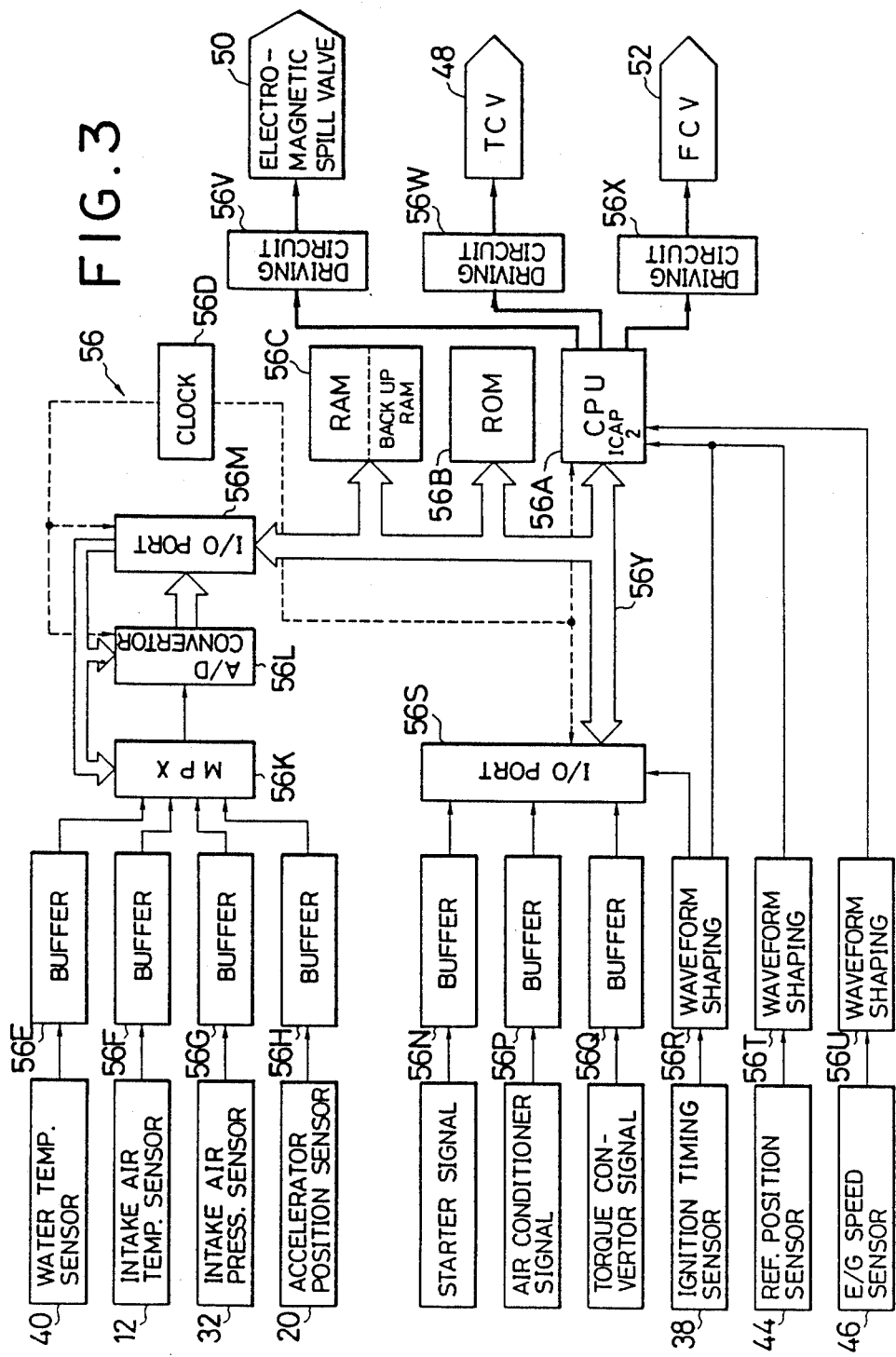
FIG. 3 is a block diagram showing the arrangement of an electronic control unit used in the first embodiment.

As shown in detail in FIG. 3, the ECU 56 includes: a central processing unit (hereinafter referred to as a "CPU") 56A for performing various calculation and processing; a read only memory (hereinafter referred to as a "ROM") 56B for storing a control program, various data and the like; a random access memory (hereinafter referred to as a "RAM") 56C for temporarily storing calculation data in the CPU 56A and the like; a clock 56D for producing clock signals; a multiplexer (hereinafter referred to as an "MPX") 56K successively inputted thereto with an output from the water temperature sensor 40, which is inputted through a buffer 56E, an output from the intake-air temperature sensor 12, which is inputted through a buffer 56F, an output from the intake-air pressure sensor 32, which is inputted through a buffer 56G, an output from the accelerator position sensor 20, which is inputted through a buffer 56H, and the like; an analogue-digital converter (hereinafter referred to as an "A/D converter") 56L for converting an analogue signal outputted from the MPX 56K into a digital signal; an input/output port 56M for inputting an output from the A/D converter 56L to the CPU 56A; an input/output port 56S for inputting a starter signal through a buffer 56N, an air conditioner signal through a buffer 56P, a torque converter signal through a buffer 56Q, an output from the ignition timing sensor 38 through a waveform shaping circuit 56R, and the like to the CPU 56A, the waveform shaping circuit 56R for waveform shaping an output from the ignition timing sensor 38 to directly input the same to an input capture port ICAP2 of the CPU 56A; a waveform shaping circuit 56T for waveform shaping an output from the reference position sensor 44 to directly input the same to the input capture port ICAP2 of the CPU 56A; a waveform shaping circuit 56U for waveform shaping an output from the engine speed sensor 46 to directly input the same to the CPU 56A; a driving circuit 56V for driving the spill valve 50 in accordance with the result of calculations made by the CPU 56A; a driving circuit 56W for driving the TCV 48 in accordance with the result of calculations made by the CPU 56A; a driving circuit 56X for driving the FCV 52 in accordance with the result of calculations made by the CPU 56A; and a common buss 56Y for interconnecting between the above-described various components to transmit data and commands.

Here, the ignition signal outputted from the waveform shaping circuit 56R is inputted not only to the input capture port ICAP2 of the CPU 56A but also to the input/output port 56S, because the ignition signal can be discriminated from the reference position signal outputted from the waveform shaping circuit 56T and inputted to the same input/output port ICAP2.

Description will hereinafter be given of the operation of the first embodiment.

Figure 4:
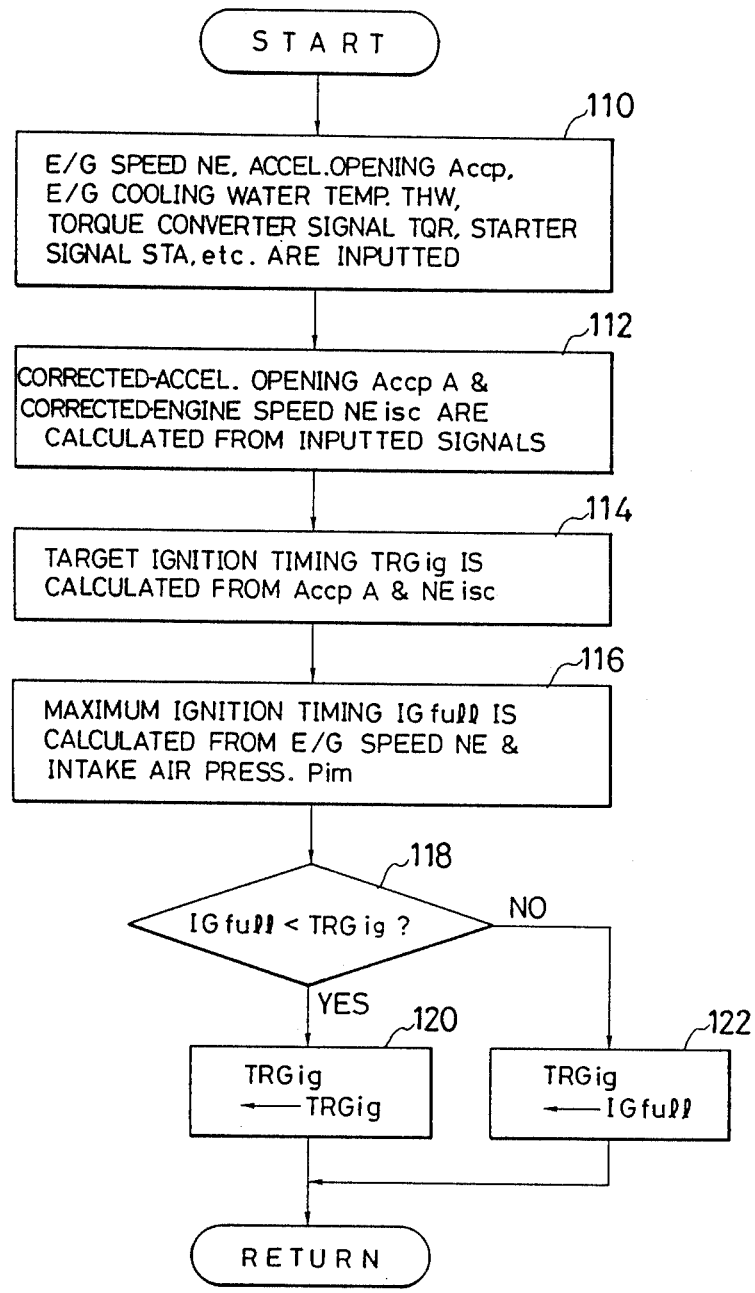
FIG. 4 is a flow chart showing a routine for calculating the target ignition timing used in the first embodiment.

Calculations of the target ignition timing in this first embodiment are carried out in accordance with the flow chart shown in FIG. 4.

More specifically, the routine repeatedly to proceeds to Step 110 in a predetermined time duration, and, in Step 110, the ECU 56 is inputted thereto with an engine speed NE obtained from an output of the engine speed sensor 46, an accelerator opening Accp detected by the accelerator position sensor 20, engine cooling water temperature THW detected by the water temperature sensor 40, a torque converter signal TQR, a starter signal STA and the like. Subsequently, the routine proceeds to Step 112, where a corrected accelerator opening Accp A and a corrected engine speed NEisc are calculated from the signals thus inputted in Step 110.

Figure 5:
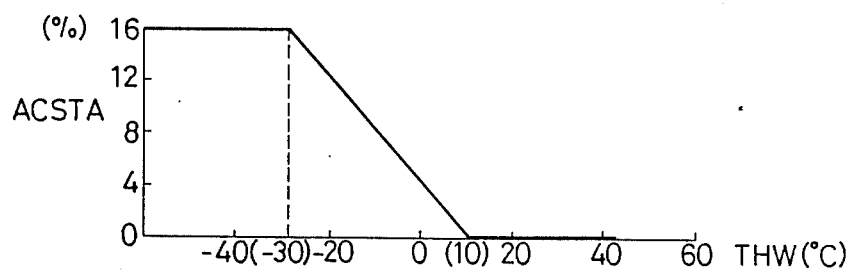
FIG. 5 is a chart showing an example of the relationship between engine cooling water temperature and a fast idle correction value used in the first embodiment.

More specifically, the corrected accelerator opening Accp A in this Step 112 is calculated in such a manner as shown below. First, a fast idle correction value ACSTA for correcting for low temperature starting is determined in accordance with the presence or absence of the starter signal STA, the engine speed NE and the engine cooling water temperature THW. When the starter signal STA is on and the engine speed NE is less than 1000 rpm, this fast idle correction value ACSTA is tuned to be a value shown in FIG. 5 in accordance with the engine cooling water temperature THW, for example. When the starter signal STA is off or the engine speed is 1000 rpm or above, the fast idle correction value ACSTA then is gradually decreased to 0% at a predetermined rate for example.

Figure 6:
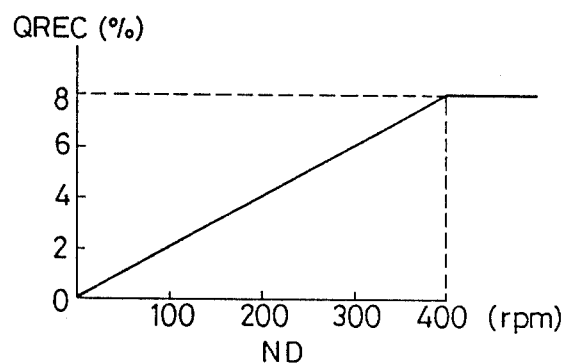
FIG. 6 is a chart showing an example of the relationship between a decreased value of the engine speed and a dashpot correction value used in the first embodiment.

Subsequently, a dashpot correction value QREC is determined in accordance with the changing conditions of the engine speed NE. More specifically, when the engine speed NE falls from the value higher than 1300 rpm, the initial value of the dashpot correction value QREC is set from the relationship shown in FIG. 6 in accordance with a decreased value ND of the engine speed NE after a lapse of 0.1 sec upon the engine speed NE reaching 1300 rpm. Thereafter, the dashpot correction value QREC is caused to decrease to 0% at a predetermined rate.

The fast idle correction value ACSTA and the dashpot correction value QREC, which are obtained as described above, are added to the detected accelerator opening Accp as shown in the following formula, so that the corrected accelerator opening Accp A can be obtained:

$$Accp\ A = Accp + ACSTA + QREC \quad (1)$$

Additionally, an acceleration increase correction value can be added to the fast idle correction value ACSTA and the dashpot correction value QREC.

Figure 7:
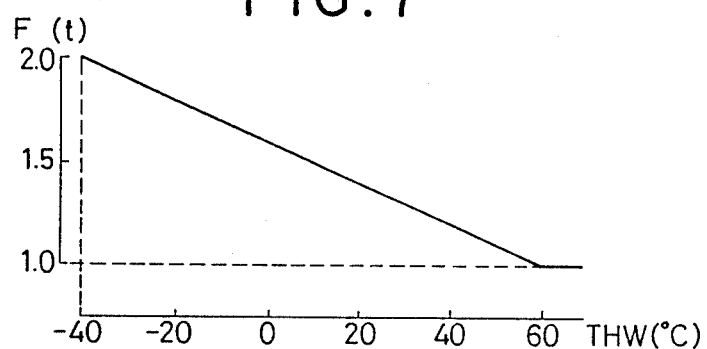
FIG. 7 is a chart showing an example of the relationship between engine cooling water temperature and a water temperature correction coefficient used in the first embodiment.

Furthermore, calculations of the corrected engine speed NEisc in the Step 112 can be made as shown below. More specifically, a water temperature correction coefficient F(t) is determined from the engine cooling water temperature THW by use of the relationship shown in FIG. 7. Subsequently, an expected control value NFp is calculated from the determined water temperature correction coefficient F(t), the torque converter signal TQR and the air conditioner signal. More specifically, when a neutral range (N range) is selected in a transmission and the air conditioner is off, the following formula (2) will be used:

$$NFp = 500 \times \{F(t) - 1\} \quad (2)$$

When a drive range (D range) is selected in the transmission and the air conditioner is off, the following formula (3) will be used:

$$NFp = 500 \times \{F(t) - 1\} + 40 \quad (3)$$

When N range is selected and the air conditioner is on, the following formula (4) will be used:

$$NFp = 500 \times \{F(t) - 1\} + \text{Max}\ [80 - 143 \times \{F(t) - 1\}, 30] \quad (4)$$

When D range is selected and the air conditioner is on, the following formula (5) will be used:

$$NFp = 500 \times \{F(t) - 1\} + \text{Max}\ [130 - 125 \times \{F(t) - 1\}, 30] \quad (5)$$

Subsequently, an integration control value NFi is determined from a difference $\Delta$NE between the target engine speed NF and the actual engine speed NE during stabilized idling. More specifically, when the engine speed NE is lower than the target engine speed NF, the integration correction value $\Delta$NFi is added to the preceding integration correction value NFi to thereby obtain an integration value of this time as shown in the following formula:

$$NFi \leftarrow NFi + NFi \quad (6)$$

Alternatively, when the engine speed NE is higher than the target engine speed NF, the integration correction value $\Delta$NFi is subtracted from the preceding integration correction value NFi to thereby obtain an integration value of this time as shown in the following formula:

$$NFi \leftarrow NFi - NFi \quad (7)$$

Furthermore, when the target engine speed NF is equal to the engine speed NE, the preceding integration value NFi is adopted as the integration value of this time.

Figure 8:
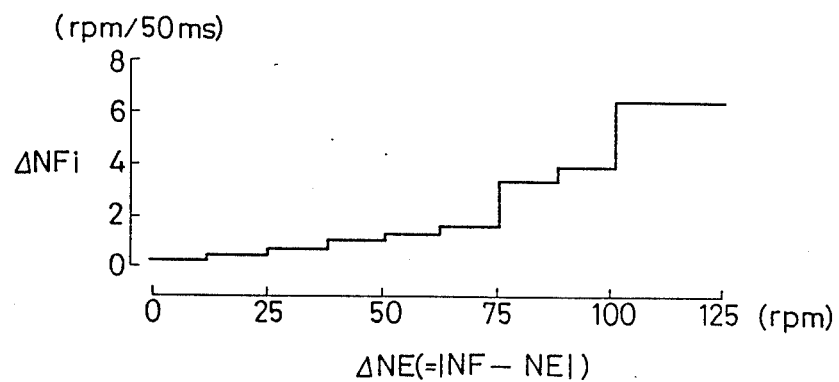
FIG. 8 is a chart showing an example of the relationship between a difference of the engine speed from the target engine speed and an integration correction value used in the first embodiment.

Here, the integration correction value $\Delta$NFi can be determined from a difference $\Delta$NE between the target engine speed NF and the engine speed NE, using the relationship shown in FIG. 8.

The expected control value NFp and the integration control value NFi are subtracted from the engine speed NE as shown in the following formula, to thereby obtain the corrected engine speed NEisc (higher than or equal to zero):

$$NEisc = Ne - (NFp + NFi) \quad (8)$$

Upon completion of the process in Step 112, the routine proceeds to Step 114, where, for example, a two dimensional map comprising the corrected accelerator opening Accp A and the corrected engine speed NEisc is searched and a target ignition timing TRGig is calculated on the basis thereof.

Figure 9:
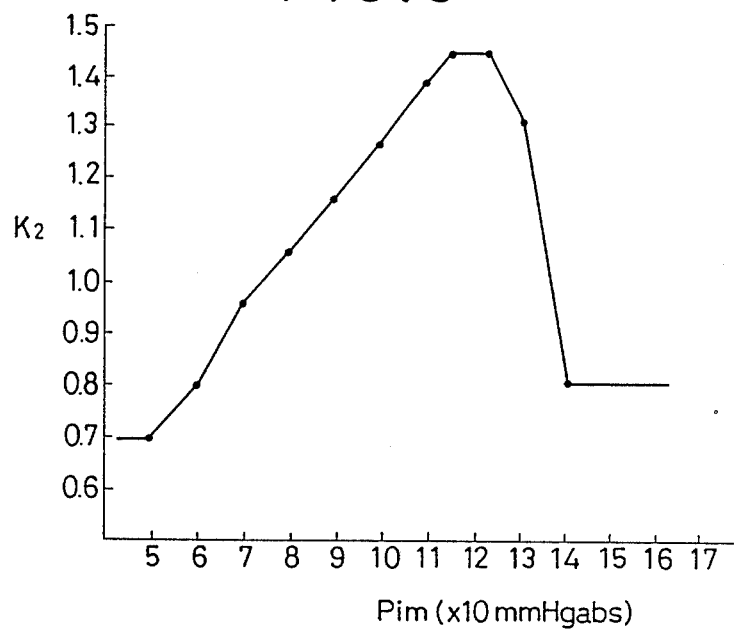
FIG. 9 is a chart showing an example of the relationship between intake-air pressure and an intake-air pressure correction coefficient used in the first embodiment.

Subsequently, the routine proceeds to Step 116, where a maximum ignition timing IGfull is calculated from an intake-air pressure Pim detected by the intake-air pressure sensor 32. More specifically, to give a necessary offset to a calculating formula, a one dimensional map of the engine speed NE is searched and an ignition timing for offset IGf$_0$ is calculated on the basis thereof. Furthermore, an intake-air pressure correction coefficient K2 is determined as commensurate to the intake-air pressure Pim from the relationship shown in FIG. 9. Subsequently, the maximum ignition timing IGfull defined by the intake-air pressure Pim is determined by use of the relationship shown in the following formula:

$$IGfull = IGf_0 - (K2 - 0.6)/0.781 \times 100 \quad (9)$$

Upon completion of the process in Step 116, the routine proceeds to Step 118, where judgement is made as to whether the maximum ignition timing IGfull is larger than the target ignition timing TRGig or not. When the result of judgement is positive, the routine proceeds to Step 120, where the target ignition timing TRGig determined in the step 114 is adopted as the target ignition timing, thus completing this routine.

Alternatively, when the result of judgement in step 118 is negative, the routine proceeds to Step 122, where the maximum ignition timing IGfull is adopted as the target ignition timing TRGig, thus completing this routine. Here, the maximum ignition timing TRGig is guarded by the maximum ignition timing IGfull defined by the intake-air pressure Pim, because in the engine with the turbocharger the intake-air pressure Pim can become higher than in the case of a normal aspiration engine. More specifically, by this operation, even when the accelerator is opened but the intake-air pressure Pim is not high, then an optimum target ignition timing TRGig according to the intake-air pressure Pim can be obtained.

Figure 10:
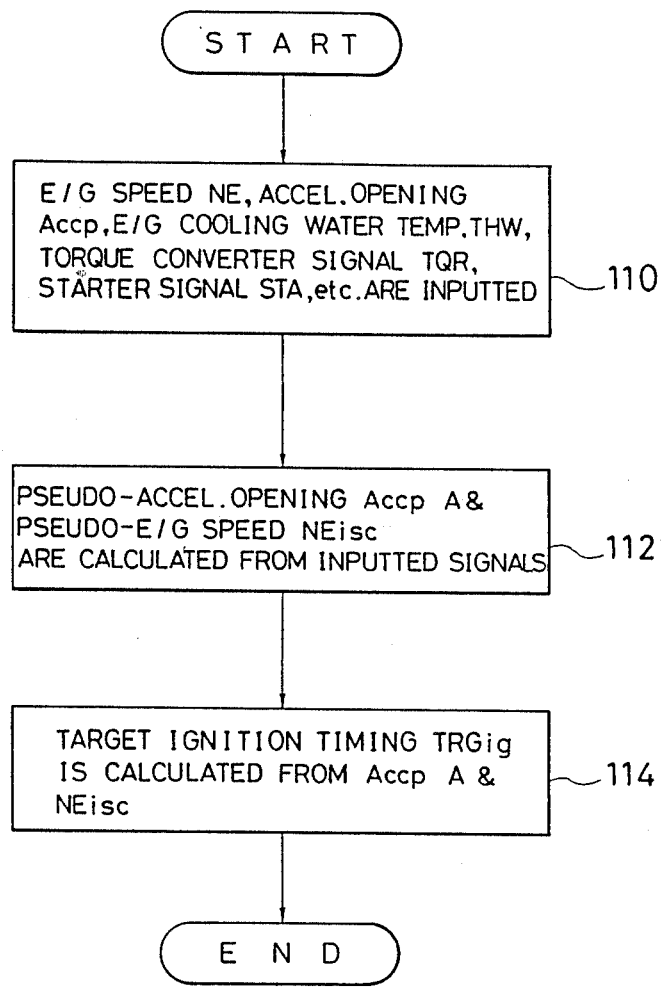
FIG. 10 is a flow chart showing a routine for calculating the target ignition timing in a second embodiment of the present invention.

In this first embodiment, the target ignition timing TRGig obtained from the corrected accelerator opening Accp A and the corrected engine speed NEisc are guarded by the maximum ignition timing IGfull defined by the intake-air pressure Pim, so that even in the vehicle having the engine with the turbocharger, the optimum target ignition timing TRGig commensurate to the intake-air pressure Pim can be obtained. However, particularly in the vehicle having the normal aspiration engine, Step 118 and the following steps thereto can be omitted, and, as in the second embodiment shown in FIG. 10, the target ignition timing TRGig obtained in Step 114 can be adopted as the target ignition timing.

In each of the above embodiments, the corrected engine load is adopted as the corrected accelerator opening Accp A, and the low temperature start correction (ACSTA) and the dashpot correction (QREC) are added to the detected accelerator opening Accp, to thereby obtain the corrected accelerator opening Accp A, so that the corrected accelerator opening used in other controls can be used as the corrected engine load of this invention. However, the type of corrected engine load need not necessarily be limited to this.

Furthermore, in each of the above embodiments, corrections (NEp and NFi) for controlling the idle rotation speed are added to the detected engine speed NE, to thereby determine the corrected engine speed NEisc, so that the corrected engine speed for controlling the idle rotation speed can be adopted as it is. However, the type of corrected engine speed need not necessarily be limited to this.

In each of the above embodiments, the present invention has been applied to the diesel engine, wherein the fuel injection quantity is controlled by the electromagnetic spill valve 50. However, the scope of application of the present invention need not necessarily be limited to this, and it is apparent that the present invention is similarly applicable to ordinary diesel engines provided with actuators for fuel injection quantity control other than electromagnetic spill valves.

Thus, while only certain embodiments of the invention have been specifically described herein, it will be apparent that numerous modifications may be made thereto without departing from the spirit and scope of the invention.

What is claimed is:

1. A method of controlling fuel ignition timing in a diesel engine, wherein an optimum target fuel ignition timing is determined in accordance with engine operating conditions, including at least an engine load and an engine speed, to control the fuel ignition timing so that said target ignition timing can be obtained, comprising the steps of:

detecting the engine load;
   detecting the engine speed;
   correcting the engine load value thus detected according to the engine operating conditions, to thereby determine a corrected engine load;
   correcting the engine speed value thus detected, to thereby determine a corrected engine speed, by adding a correction value for controlling an idle rotation speed to said detected engine speed value, said correction value for controlling said idle rotation speed being determined by an expected control value determined in accordance with a cooling water temperature coefficient obtained from an engine cooling water temperature, a torque converter signal, an air conditioner signal, and an integration control value determined in accordance with a difference between a target engine speed and said detected engine speed under stabilized idling conditions; and
   determining a target ignition timing on the basis of said corrected engine load and said corrected engine speed.

2. A method of controlling fuel ignition timing in a diesel engine, wherein an optimum target fuel ignition timing is determined in accordance with engine operating conditions, including at least an accelerator opening and an engine speed, to control the fuel ignition timing so that said target ignition timing can be obtained, comprising the steps of:

detecting the accelerator opening;
   detecting the engine speed;
   correcting the accelerator opening value thus detected, to thereby determine a corrected accelerator opening, by adding a low temperature start correction value and a dashpot correction value to said detected accelerator opening value;

correcting the engine speed value thus detected according to the engine operating conditions, to thereby determine a corrected engine speed; and determining a target ignition timing on the basis of said corrected accelerator opening and said corrected engine speed.

3. A method of controlling fuel ignition timing as set forth in claim 1, wherein a low temperature start correction value and a dashpot correction value are added to a detected accelerator opening value, to thereby determine a corrected accelerator opening, which is used as the value of said corrected engine load.

4. A method of controlling fuel ignition timing as set forth in claim 3, wherein said low temperature start correction value comprises a fast idle correction value determined in accordance with the presence or absence of a starter signal, the engine speed and an engine cooling water temperature.

5. A method of controlling fuel ignition timing as set forth in claim 3, wherein said dashpot correction value is determined in accordance with the changing conditions of said detected engine speed.

6. A method of controlling fuel ignition timing as set forth in claim 1, wherein a maximum target ignition timing is determined by an intake-air pressure.

7. A method of controlling fuel ignition timing as set forth in claim 2, wherein said low temperature start correction value comprises a fast idle correction value determined in accordance with the presence or absence of a starter signal, the engine speed and an engine cooling water temperature.

8. A method of controlling fuel ignition timing as set forth in claim 2, wherein said dashpot correction value is determined in accordance with the changing conditions of said detected engine speed.

* * * * *